(12) United States Patent
Zhao

(10) Patent No.: US 7,895,429 B2
(45) Date of Patent: Feb. 22, 2011

(54) BASIC INPUT/OUTPUT SYSTEM MEMORY SIMULATION MODULE

(75) Inventor: Chun Yan Zhao, Kunshan (CN)

(73) Assignee: Micro-Star International Co., Ltd., Taipei Hsien (TW)

( * ) Notice: Subject to any disclaimer, the term of this patent is extended or adjusted under 35 U.S.C. 154(b) by 654 days.

(21) Appl. No.: 11/877,017

(22) Filed: Oct. 23, 2007

(65) Prior Publication Data

US 2008/0301427 A1 Dec. 4, 2008

(30) Foreign Application Priority Data

May 30, 2007 (TW) .............................. 96119334 A

(51) Int. Cl.
*G06F 15/177* (2006.01)
(52) U.S. Cl. ......................................................... 713/2
(58) Field of Classification Search .................... 713/2, 713/1
See application file for complete search history.

(56) References Cited

U.S. PATENT DOCUMENTS

| 5,768,563 | A * | 6/1998 | Porter et al. .................. 703/27 |
| 7,249,213 | B2 * | 7/2007 | Feng et al. .................. 710/305 |
| 2002/0062461 | A1 * | 5/2002 | Nee et al. ...................... 714/28 |
| 2006/0224377 | A1 * | 10/2006 | Wang et al. .................... 703/24 |

* cited by examiner

*Primary Examiner*—Thomas Lee
*Assistant Examiner*—Eric Chang
(74) *Attorney, Agent, or Firm*—Rabin & Berdo, P.C.

(57) ABSTRACT

A basic input/output system (BIOS) memory simulation module includes a first transmission interface unit adapted to receive an updated BIOS data from an external source, a second transmission interface unit adapted to be connected electrically to a computer under test, a memory unit, and a control unit connected electrically to the first transmission interface unit, the second transmission interface unit and the memory unit. The control unit is operable to store the updated BIOS data from the first transmission interface unit into the memory unit, and to output the updated BIOS data stored in the memory unit to the computer under test via the second transmission interface unit.

13 Claims, 3 Drawing Sheets

BASIC INPUT/OUTPUT SYSTEM MEMORY SIMULATION MODULE

CROSS-REFERENCE TO RELATED APPLICATION

This application claims priority of Taiwanese Application No. 096119334, filed on May 30, 2007.

BACKGROUND OF THE INVENTION

1. Field of the Invention

The invention relates to a basic input/output system (BIOS) memory simulation module, more particularly to a BIOS memory simulation module for BIOS testing.

2. Description of the Related Art test BIOS data is generally stored in a BIOS ROM on a main board of a computer. Upon power-on of the computer, a microprocessor (CPU) reads the BIOS data stored in the BIOS ROM for initialization.

When updating the BIOS data stored in the BIOS ROM, the BIOS ROM is required to be detached from the main board of the computer, and updated BIOS data is then written into the BIOS ROM. Thereafter, the BIOS RON is placed on the main board of the computer.

However, for a BIOS developer, it is required to frequently detach a BIOS ROM from a computer under test during a BIOS test, thereby easily resulting in damage to the BIOS ROM. Furthermore, it takes a relatively long time (about 1.5 minutes) to update the BIOS data stored in the BIOS ROM of the computer under test.

SUMMARY OF THE INVENTION

Therefore, the object of the present invention is to provide a basic input/output system memory simulation module that can overcome the aforesaid drawbacks of the prior art.

According to the present invention, a basic input/output system (BIOS) memory simulation module comprises:

a first transmission interface unit adapted to receive an updated BIOS data from an external source;

a second transmission interface unit adapted to be connected electrically to a computer under test;

a memory unit; and a control unit connected electrically to the first transmission interface unit, the second transmission interface unit and the memory unit, the control unit being operable to store the updated BIOS data from the first transmission interface unit into the memory unit, and to output the updated BIOS data stored in the memory unit to the computer under test via the second transmission interface unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
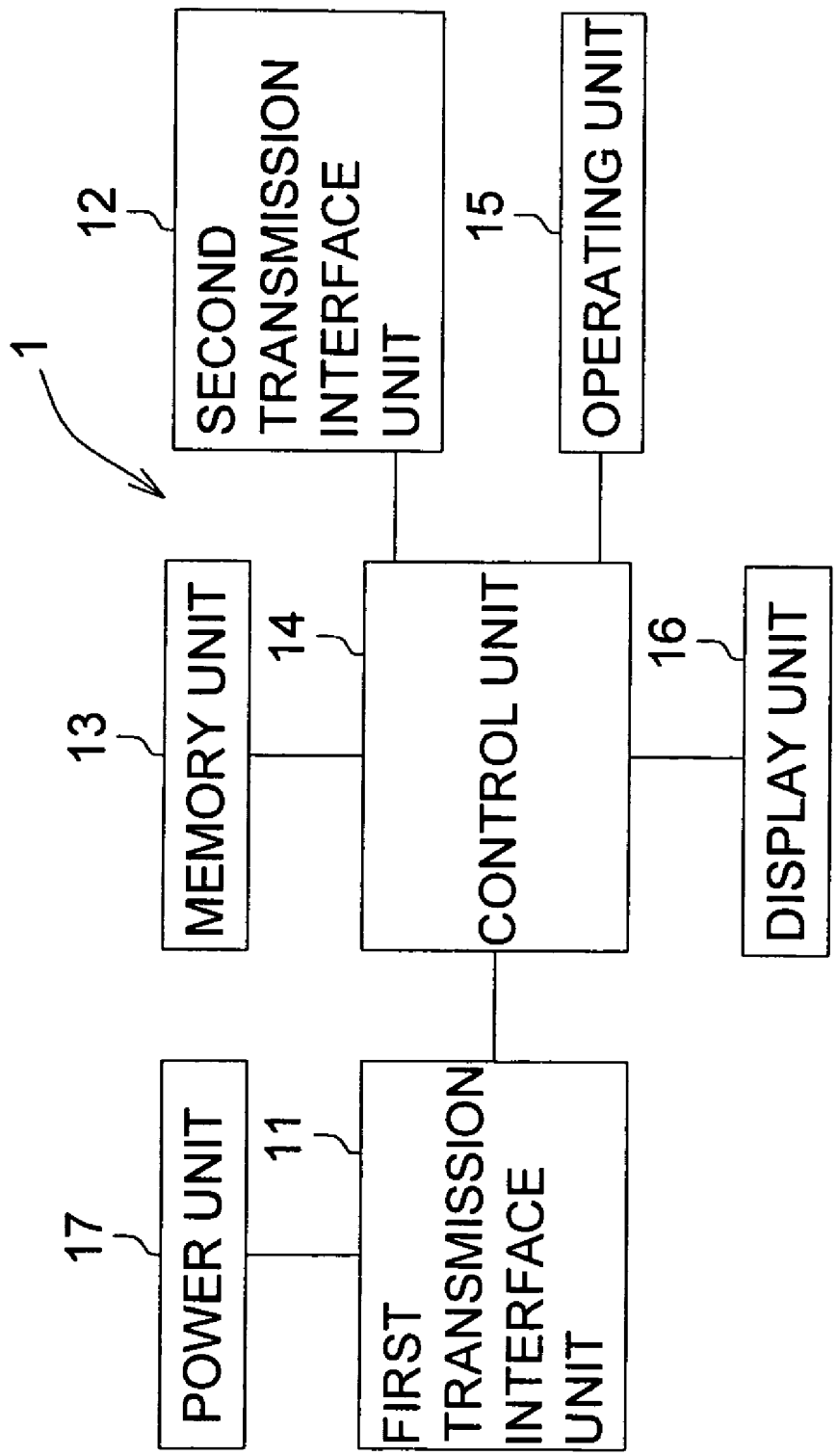
FIG. 1 is a schematic circuit block diagram illustrating the preferred embodiment of a BIOS memory simulation module according to the present invention.
Figure 2:
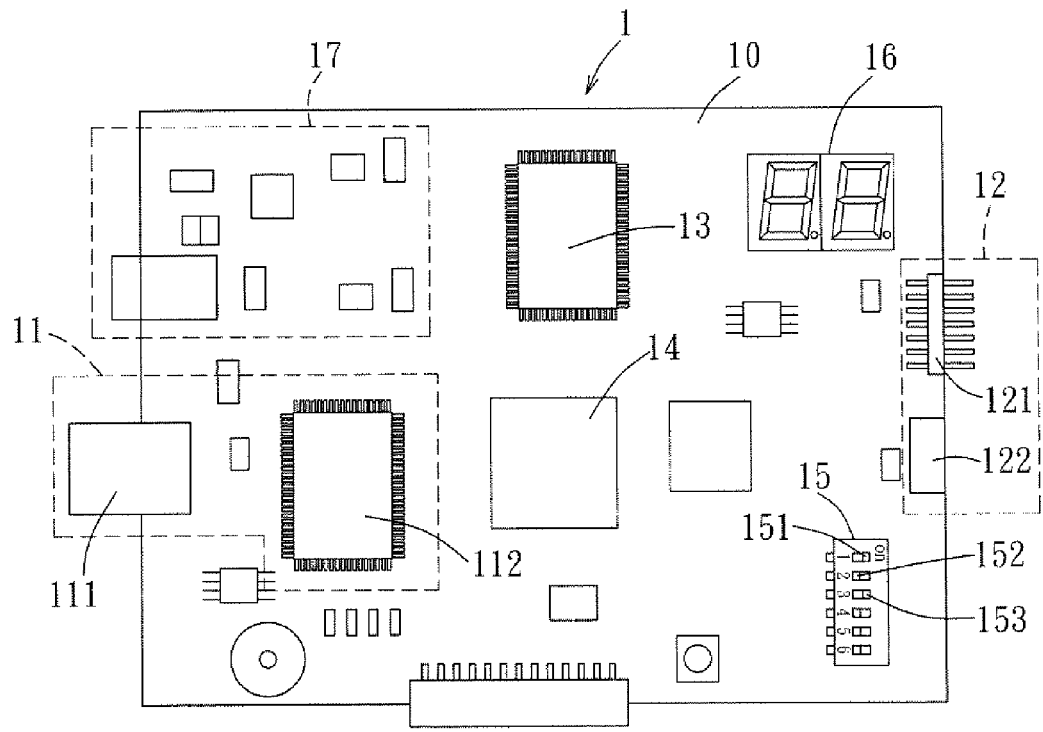
FIG. 2 is a schematic view showing the preferred embodiment.
Figure 3:
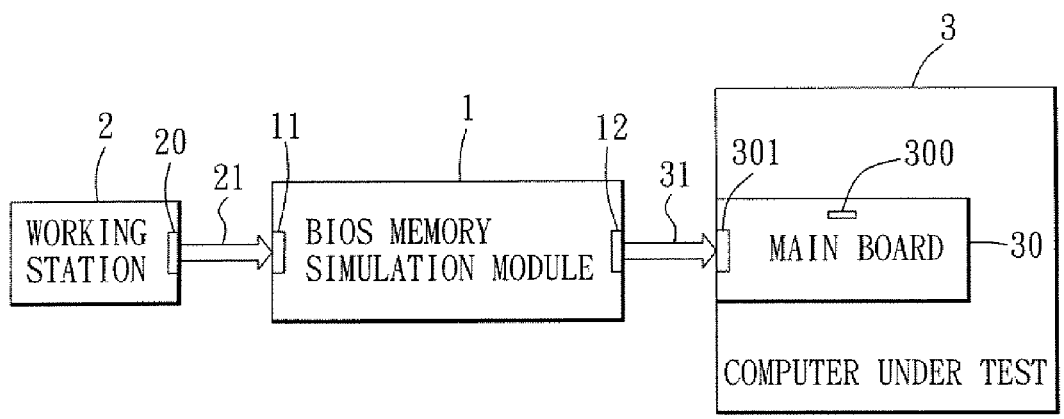
FIG. 3 is a schematic block diagram showing a BIOS testing system that incorporates the preferred embodiment.

Referring to FIGS. 1 to 3, the preferred embodiment of a BIOS memory simulation module 1 according to the present invention is shown to include a first transmission interface unit 11, a second transmission interface unit 12, a memory unit 13, and a control unit 14. In this embodiment, the BIOS memory simulation module 1 is adapted to cooperate with a working station 2, such as a computer, to perform a BIOS test for a computer under test 3, as shown in FIG. 3. The working station 2 has a USB connector 20. The computer under test 3 includes a main board 30 installed with a BIOS ROM 300 and a transmission port 301.

The first transmission interface unit 11 is adapted to receive updated BIOS data from an external source. In this embodiment, the working station 2 serves as the external source. The first transmission interface unit 11 includes a USB connector 111 and a USB controller 112 (see FIG. 2). The USB connector 111 is adapted to be connected electrically to the USB connector 20 of the working station 2 via a USB transmission line 21, as shown in FIG. 3, such that the updated BIOS data from the working station 2 can be transmitted to the first transmission interface unit 11 via the USB connector 20 of the working station 2, the USB transmission line 21 and the USB connector 11. For example, the USB controller 112 can be a CY7C68013A IC available from Cypress Corporation, but is not limited thereto.

The second transmission interface unit 12 is adapted to be connected electrically to the computer under test 3. In this embodiment, the second transmission interface unit 12 includes a low pin count (LPC) connector 121 and a serial peripheral interface (SPI) connector 122 (see FIG. 2). As such, if the transmission port 301 of the computer under test 3 has an LPC interface, the LPC connector 121 of the second transmission interface unit 12 is selectively coupled to the transmission port 301 via an LPC transmission line 31 (see FIG. 3). Alternatively, the LPC connector 121 may be coupled directly to the transmission port 301. On the other hand, if the transmission 301 of the computer under test 3 has an SPI interface, the SPI connector 122 of the second transmission interface unit 12 is selectively coupled to the transmission port 301 of the computer under test 3.

In this embodiment, the memory unit 13 includes a high access speed storage medium, such as a static random access memory (SRAM), but is not limited thereto. In other embodiments, the memory unit 13 may include a flash memory.

The control unit 14 is connected electrically to the first transmission interface unit 11, the second transmission interface unit 12 and the memory unit 13. The control unit 14 is operable to store the updated BIOS data from the first transmission interface unit 11 into the memory unit 13 after compression, and to output the updated BIOS data stored in the memory unit 13 after decompression to the main board 30 of the computer under test 3 via the second transmission interface unit 12, the transmission line 31 and the transmission port 301. In this embodiment, the control unit 14 includes a field-programmable gate array (FPCA) that can be an XC3S500E_FT256 IC available from XILINX Corporation, for example. Furthermore, when the computer under test 3 connected electrically to the second transmission interface unit 12 is initialized, the control unit 14 is adapted to receive from the computer under test 3 post code data indicating operating condition of BIOS of the computer under test 3.

Furthermore, the BIOS memory simulation module 1 further includes a circuit board 10, an operating unit 15, a display unit 16, and a power unit 17.

The circuit board 10 is mounted with and is connected electrically to the first transmission interface unit 11, the second transmission interface unit 12, the memory unit 13 and the control unit 14, as shown in FIG. 2.

The operating unit 15 is mounted on the circuit board 10, and is connected electrically to the control unit 14. The operating unit 15 is operable so as to output a control signal to the control unit 14 such that the control unit 14 determines, based on the control signal, whether or not the updated BIOS data is to be outputted to the computer under test 3 via a selected one of the LPC connector 121 and the SPI connector 122. In this embodiment, the operating unit 15 includes a plurality of switches 151, 152, 153, each of which is operated manually so as to generate the control signal, as shown in FIG. 2. For example, when the switch 151 is switched to an ON state, the control unit 14 determines that the updated BIOS data stored in the memory unit 13 is outputted. When the switch 152 is switched to an ON state while the switch 153 is switched to an OFF state, the SPI connector 122 of the second transmission interface unit 12 is selected to interconnect electrically the control unit 14 and the computer under test 3. On the other hand, when the switch 153 is switched to an ON state while the switch 152 is switched to an OFF state, the LPC connector 121 of the second transmission interface 12 is selected to interconnect electrically the control unit 14 and the computer under test 3.

The display unit 16 is mounted on the circuit board 10, and is connected electrically to the control unit 14 for showing the post code data from the computer under test 3 thereon. In this embodiment, the display unit 16 includes two seven-segment displays, as shown in FIG. 2, but is not limited thereto. Hence, if BIOS booting for the computer under test 3 fails, the BIOS data used by the computer under test 3 can be debugged based on the post code data shown on the display unit 16.

The power unit 17 is connected electrically to the first transmission interface unit 11 for receiving an external electrical power signal via the first transmission interface unit 11 and for supplying electrical power to the first transmission interface unit 11, the second transmission interface 12, the memory unit 13, the control unit 14, the operating unit 15 and the display unit 16.

Figure 4:
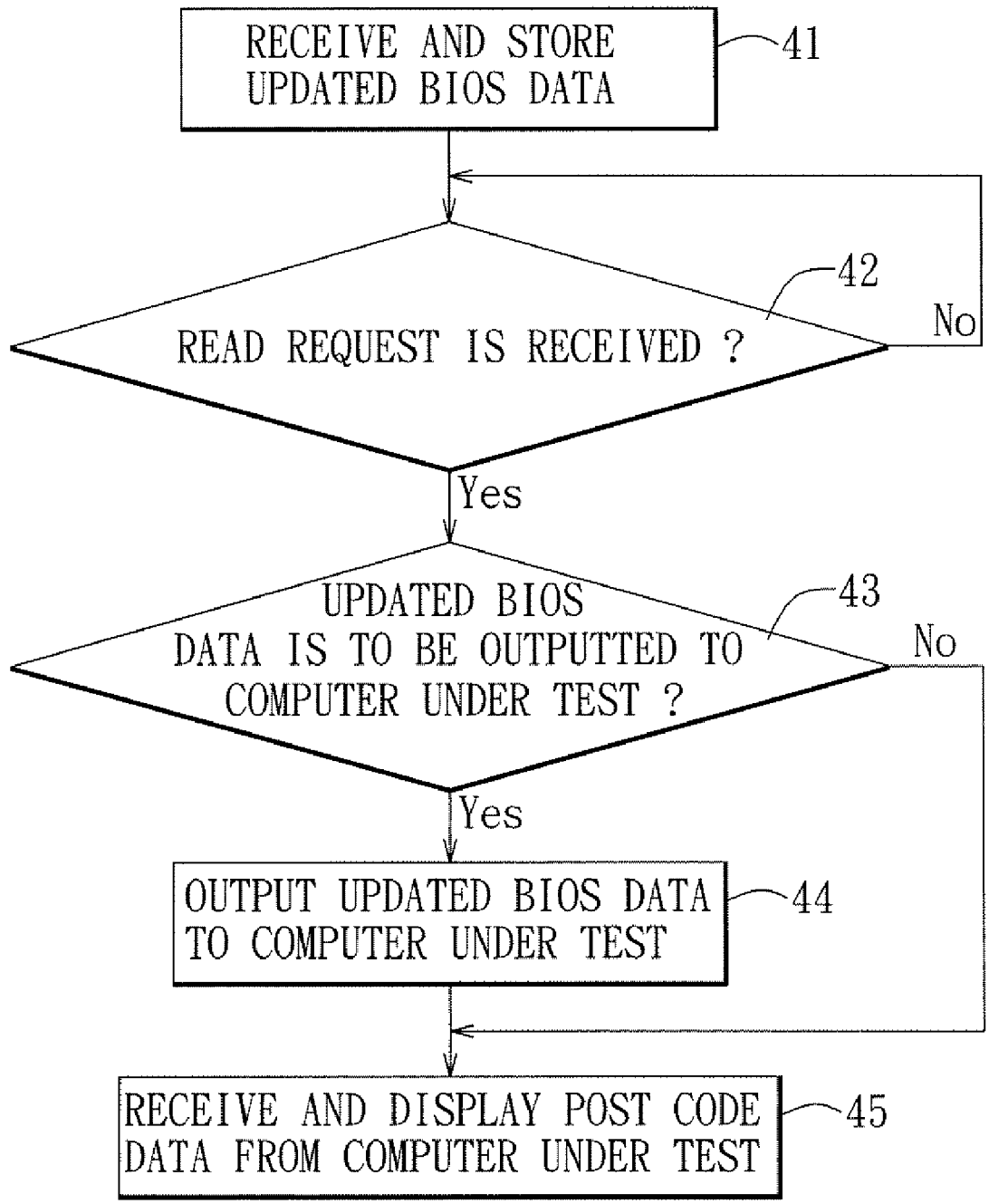
FIG. 4 is a flow chart illustrating how the preferred embodiment is operated during a BIOS test.

Referring to FIG. 4, there is shown a flow chart illustrating how the BIOS memory simulation module 1 is operated during the BIOS test for the computer under test 3.

In step 41, the control unit 14 receives the updated BIOS data from the working station 2 via the first transmission interface unit 11, and stores the updated BIOS data in the memory unit 13. Then, the flow goes to step 42.

In step 42, the control unit 14 determines whether a read request from the computer under test 3 is received thereby. In particular, upon power-on or reset of the computer under test 3, the computer under test 3 sends to the control unit 14 via the second transmission interface unit 12 a read request for BIOS data to execute booting operation. If negative, the flow goes back to step 42. Otherwise, the flow goes to step 43.

In step 43, the control unit 14 determines whether or not the updated BIOS data stored in the memory unit 13 is to be outputted to the computer under test 3 via the second transmission interface unit 12 in response to the read request received in step 42 based on the control signal from the operating unit 15. If affirmative, the flow goes to step 44. In this case, the control unit 14 disables the BIOS ROM 300 of the computer under test 3. Otherwise, the flow proceeds to step 45. In this case, since the control unit 14 does not output the updated BIOS data to the computer under test 3, the computer under test 3 uses BIOS data stored in the BIOS ROM 300 to execute booting operation, and sends continuously the post code data to the control unit 14 via the second transmission interface unit 12.

In step 44, the control unit 14 outputs the updated BIOS data stored in the memory unit 13 to the computer under test 3 via the second transmission interface unit 12. In this case, the computer under test 3 uses the updated BIOS data from the BIOS memory simulation module 1 to execute booting operation. Then, the flow goes to step 45.

In step 45, the control unit 14 is adapted to receive the post code data from the computer under test 3, and displays the post code data on the display unit 16.

In sum, during BIOS test, the memory unit 13 serves to replace the BIOS ROM 300 of the computer under test 3 without requiring detachment of the BIOS ROM 300 from the computer under test 3 such that the time spent in detaching the BIOS ROM from the computer under test as encountered in the prior art can be saved. Moreover, since the memory unit 13 is a high access speed storage medium, the time spent in writing the updated BIOS data into the memory unit 13 is about several seconds, and is much shorter than that spent in writing the updated BIOS data into the BIOS ROM 300 of the computer under test 3 (about 1.5 minutes). Therefore, the BIOS memory simulation module 1 of the present invention can achieve the BIOS test in a shorter amount of time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A basic input/output system (BIOS) memory simulation module comprising:

a first transmission interface unit adapted to receive an updated BIOS data from an external source;

a second transmission interface unit adapted to be connected electrically to a computer under test;

a memory unit; and a control unit connected electrically to said first transmission interface unit, said second transmission interface unit and said memory unit, said control unit being operable to store the updated BIOS data from said first transmission interface unit into said memory unit, said control unit having means for determining whether or not to output the updated BIOS data from said memory unit to the computer under test via said second transmission interface unit, wherein if said control unit determines not to output the updated BIOS data to the computer under test, the computer under test uses BIOS data stored in a BIOS ROM of the computer under test, and wherein if said control unit determines to output the updated BIOS data stored in said memory unit to the computer under test via said second transmission interface unit, said control unit disables the BIOS ROM of the computer under test and the computer under test uses the updated BIOS data from said BIOS memory simulation module for BIOS testing.

2. The BIOS memory simulation module as claimed in claim 1, wherein said memory unit includes a high access speed storage medium.

3. The BIOS memory simulation module as claimed in claim 1, wherein said memory unit includes a static random access memory.

4. The BIOS memory simulation module as claimed in claim 1, wherein said first transmission interface unit includes a USB connector.

5. The BIOS memory simulation module as claimed in claim 4, further comprising a power unit connected electrically to said first transmission interface for receiving an external electrical power signal via said first transmission interface unit and for supplying electrical power to said first transmission interface unit, said second transmission interface unit, said memory unit and said control unit.

6. The BIOS memory simulation module as claimed in claim 1, wherein said second transmission interface unit includes at least one of a low pin count (LPC) connector and a serial peripheral interface (SPI) connector.

7. The BIOS memory simulation module as claimed in claim 1, wherein said second transmission interface unit includes a low pin count (LPC) connector and a serial peripheral interface (SPI) connector, said BIOS memory simulation module further comprising an operating unit connected electrically to said control unit and operable so as to output a control signal to said control unit, said control unit being responsive to said control signal to determine whether or not to output updated BIOS data to the computer under test via a selected one of said LPC connector and said SPI connector.

8. The BIOS memory simulation module as claimed in claim 7, wherein said operating unit includes a plurality of switches, each of which is operated manually so as to generate the control signal.

9. The BIOS memory simulation module as claimed in claim 1, wherein said control unit is adapted to receive post code data from the computer under test via said second transmission interface unit.

10. The BIOS memory simulation module as claimed in claim 9, further comprising a display unit connected electrically to said control unit for showing the post code data from the computer under test thereon.

11. The BIOS memory simulation module as claimed in claim 1, further comprising a circuit board mounted with and connected electrically to said first transmission interface unit, said second transmission interface unit, said memory unit and said control unit.

12. A method for testing BIOS, including:
receiving and storing an updated BIOS data from an external source to a basic input/output system (BIOS) memory simulation module;
determining by the input/output system (BIOS) memory simulation module whether or not to output the updated BIOS data to a computer under test that is electrically connected thereto;
if the BIOS memory simulation module determines not to output the updated BIOS data to the computer under test, the computer under test uses BIOS data stored in a BIOS ROM of the computer under test; and
if the BIOS memory simulation module determines to output the updated BIOS data to the computer under test, then the BIOS memory simulation module disables the BIOS ROM of the computer under test and the computer under test uses the updated BIOS data from the BIOS memory simulation module for BIOS testing.

13. A basic input/output system (BIOS) memory simulation module comprising:
a first transmission interface unit adapted to receive an updated BIOS data from an external source;
a second transmission interface unit adapted to be connected electrically to a computer under test;
an operation unit, outputting a control signal;
a memory unit; and
a control unit connected electrically to said first transmission interface unit, said second transmission interface unit, said control unit and said memory unit, said control unit being operable to store the updated BIOS data from said first transmission interface unit into said memory unit, said control unit having means for determining whether or not to output the updated BIOS data from said memory unit to the computer under test based on said control signal;
wherein if said control unit determines not to output the updated BIOS data to the computer under test based on said control signal, the computer under test uses BIOS data stored in a BIOS ROM of the computer under test for BIOS testing; and
if said control unit determines to output the updated BIOS data stored in said memory unit to the computer under test based on said control signal, said control unit disables the BIOS ROM of the computer under test and the computer under test uses the updated BIOS data from said BIOS memory simulation module for BIOS testing.

* * * * *